United States Patent
Teraoka (10) Patent No.: US 7,040,182 B2
(45) Date of Patent: May 9, 2006

(54) STRESS SENSOR

(75) Inventor: Hideyuki Teraoka, Nagano (JP)

(73) Assignee: Elantech Devices Corporation, Taipei Hsien (TW)

( * ) Notice: Subject to any disclaimer, the term of this patent is extended or adjusted under 35 U.S.C. 154(b) by 65 days.

(21) Appl. No.: 10/495,058

(22) PCT Filed: Jun. 27, 2002

(86) PCT No.: PCT/JP02/06509

§ 371 (c)(1),
(2), (4) Date: May 5, 2004

(87) PCT Pub. No.: WO03/016848

PCT Pub. Date: Feb. 27, 2003

(65) Prior Publication Data

US 2005/0039549 A1    Feb. 24, 2005

(30) Foreign Application Priority Data

Aug. 9, 2001    (JP)    ............................. 2001-242547

(51) Int. Cl.
*G01L 1/04*    (2006.01)

(52) U.S. Cl. ................................................. 73/862.627
(58) Field of Classification Search ................ 345/161; 73/862.267
See application file for complete search history.

(56) References Cited

U.S. PATENT DOCUMENTS 6,121,954 A * 9/2000 Seffernick .................... 345/161

* cited by examiner

*Primary Examiner*—Max Noori
(74) *Attorney, Agent, or Firm*—J.C. Patents (57) ABSTRACT

A stress sensor having a post (6) fixed to or integrated with the surface of an insulation substrate (1) capable of determining the direction and magnitude of a stress applied to the post (6) from changes in the characteristics of a strain gauge (2) made by a stimulus to the strain gauge (2) caused by the stress, wherein a stress to the post (6) can be converted efficiently into changes in the characteristics of the strain gauge (2). Consequently, the stress sensor has a strain gauge (2)-disposed member provided with a locally-easy-to-deform portion where the strain gauge (2) is disposed. The strain gauge (2) is a resistance element (8) and is disposed on the surface of the insulation substrate (1), the insulation substrate mainly contains a resin material, and the easy-to-deform portion is preferably a thin-wall portion (7).

8 Claims, 5 Drawing Sheets

STRESS SENSOR

FIELD OF THE INVENTION

The present invention relates to a stress sensor for pointing device of personal computers, multi-function/multi-direction switch of electronic devices etc.

DESCRIPTION OF RELATED ART

The Japanese Patent Laid-open Publication No. JP-2000-267803 discloses a stress sensor which has a post fixed to or integrated with the surface of an insulation substrate capable of determining the direction and magnitude of a stress applied to the post from changes in the characteristics of a strain gauge made by a stimulus to the strain gauge caused by the stress.

The structure of the stress gauge is shown in FIG. 6(a). Resistance elements 22 serving as strain gauges are located on four positions along two perpendicular lines on the surface of the substrate 20, wherein the perpendicular lines intersect at the center of the surface of the substrate 20. The strain gauges 2 are arranged equidistant along the intersection of the two perpendicular lines. The center of the surface of the substrate 20 is substantially equivalent to the center of the bottom of the post 30 with a squared-shaped bottom profile. The resistance elements 22 are fixed on the substrate 20 such that each of the edges of the profile 30b of the post bottom is opposite to each of the resistance elements 22.

FIG. 6(b) shows the operation of the strain gauge in the case when a stress of X direction (i.e. any transverse direction) applies to the post 30. FIG. 6(c) shows the operation of the strain gauge in the case when a stress of a Z direction (i.e. downward direction) applies to the post 30.

In the both operations of FIGS. 6(b) and 6(c), solder 32 are fixed at the ends of the substrate 20 through a circuit plate 31, and the stress makes the portions of the substrate 20 corresponding to the profile 30b of the bottom of the post flex. The resistance elements 22 located in the portion stretch or contract due to the stress. The resistance of the resistance element 22 changes accordingly.

However, the sensitivity (i.e. output) corresponding to the stress applied to the post 30 is small. The stress applied to the post 30 cannot be efficiently converted into the change of the resistance.

One of the objects of the present invention is to provide a stress sensor wherein a stress to the post can be converted efficiently into changes in the characteristics of the strain gauge.

SUMMARY OF THE INVENTION:

For solving the above problems, the present invention provides a stress sensor comprising a post 6 fixed to or integrated with a surface of an insulation substrate 1. The stress sensor is capable of determining a direction and a magnitude of a stress applied to the post 6 from changes in characteristics of a strain gauge 2 made by a stimulus to the strain gauge 2 caused by the stress, wherein a member with the strain gauge 2 arranged thereon has a locally-easy-to-deform portion, and the strain gauge 2 is arranged at the locally easy-to-deform portion.

If there is a locally-easy-to-deform portion in the member with the strain gauges 2 arranged thereon, the stress is easily transferred to the member with the strain gauges 2 arranged thereon and the stress is easily concentrated at the easy-to-deform portion. Because the strain gauge 2 is arranged at the easy-to-deform portion, the strain gauge can get big stimulus and the characteristics of the strain gauge 2 changes largely. Thus, the stress to the post 6 can be efficiently converted into changes of characteristics of the strain gauge 2 to solve the above problem.

Figure 1:
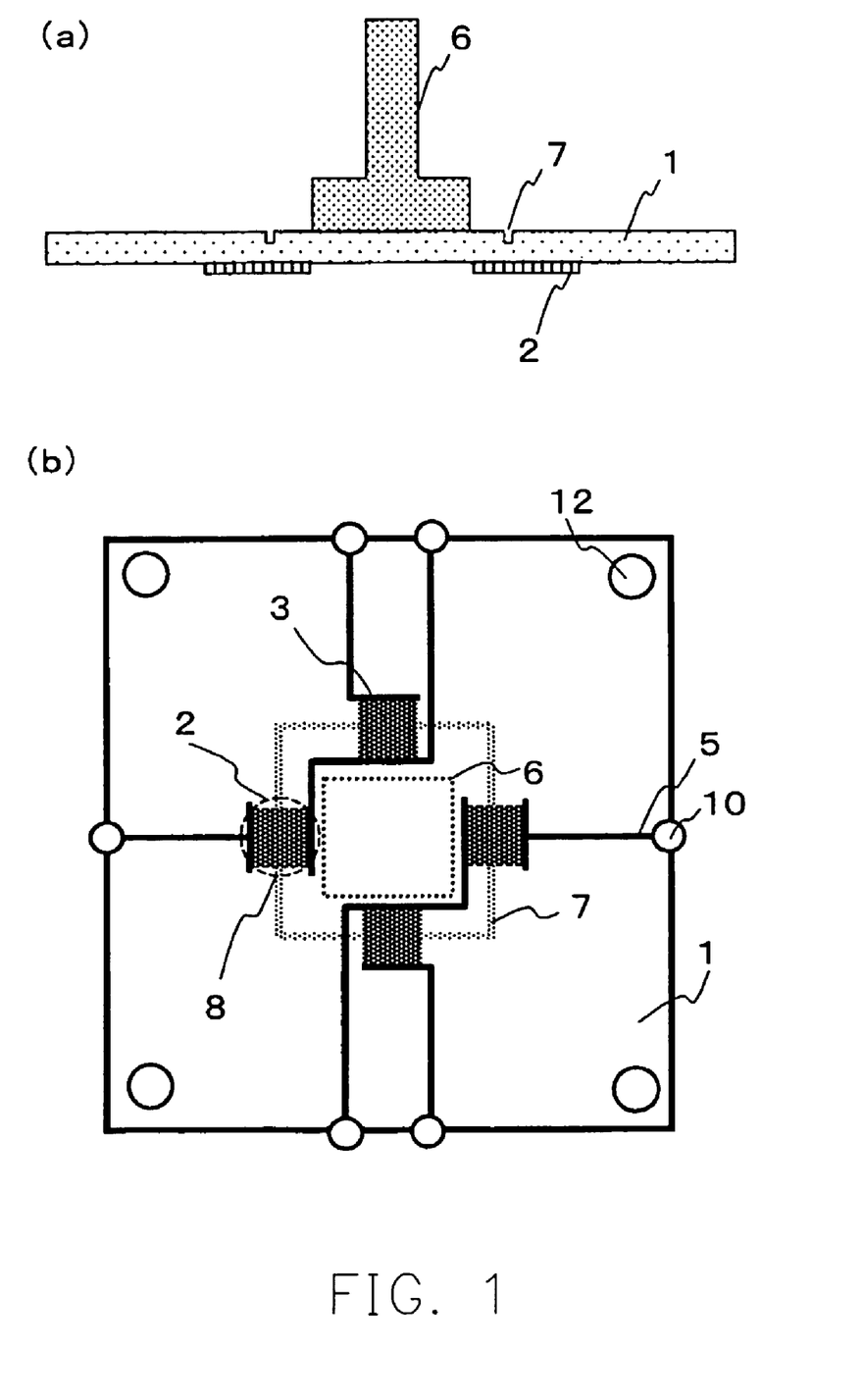
FIGS. 1(a) and 1(b) show a side view and a bottom view of a stress sensor of the present invention.

The word "locally" means a location on the member close to the region where the strain gauges 2 are arranged and an extension region accordingly. As shown in FIG. 1, thin-wall portion 7 is formed on the insulation substrate 1, and the strain gauges 2 are arranged crossing the thin-wall portion 7. The reason for defining the word "locally" into "narrow region" is in the point of maintaining the stress sensor in a desired strength. If it is only to efficiently convert a stress to the post 6 into changes of characteristic of the strain gauges 2, the whole region (as shown in FIG. 1) or a part of the region surrounded by the thin-wall portion 7 (as shown in FIG. 1(b)) of the insulation substrate 1 can be thin. However, with this kind of structure, in the case when the bottom profile of the post 6 stimulates the thin-wall portion 7 too much, the insulation substrate 1 is plastically deformed. The present invention is to eliminate this disadvantage.

According to the stress sensor of the present invention, the strain gauges 2 can be formed on the surface of the insulation substrate 1 and can be formed on the side surface of the post 6 as long as having a mechanism for stimulating the resistance element 2 caused by a stress to the post 6.

The stimulus can change the electrical characteristic of the strain gauges 2. The flexing (i.e. deformation) of the side surface of the post 6 or the insulation substrate 1 results in the stretching or contracting of the strain gauges 2 and the pressing of or removal of the pressing of the strain gauges. The stretching and contracting of the strain gauge 2 are shown as FIGS. 6(b) and 6(c). The resistance of the resistance element becomes large due to the stretching of the resistance element 22 and becomes small due to the contracting of the resistance element 22. The example for pressing or removal of the pressing of the strain gauges 2 is that the strain gauges 2 are arranged between the bottom of the post 6 and the insulation substrate 1. Due to the pressing of the strain gauges 2, the strain gauges 2 and the easy-to-deform portions of the member with the strain gauges 2 arranged thereon are deformed at the same time to generate large changes of characteristic. By removing the pressing, the characteristic returns to the status prior to the pressing.

Generally speaking, a stress sensor should comprise a control portion for detecting and calculating electrical characteristic such as the resistance to function as a stress sensor.

The sentence "the post 6 is fixed on the surface of the insulation substrate 1" means that the post 6 and the substrate 1 are different members and are fixed with each other via an adhesion. Moreover, the sentence "the post 6 is integrated with the substrate 1" means the post 6 and the substrate 1 are formed into one body. "The bottom profile of the post" of the latter represents the portion corresponding to "the bottom profile of the post" of the former.

Elements that changes the electrical characteristic due to a stress applied thereon, such as the resistance element 8 as shown in FIG. 1(b) is suitable to be the strain gauge 2. Except the resistance element 8, a chip-migration resistor having a thin or thick film formed on the insulation substrate 1 or a piezoelectrical element such as piezoelectrical ceramic comprising PZT (lead ziconate titanate) is preferred to be the strain gauge 2.

The easy-to-deform portion is the thin-wall portion 7 formed in the insulation substrate 1 as shown in FIG. 1, for example. Methods of forming the thin-wall portions 7 are described as follows. The thin-wall portions 7 together with the insulation substrate 1 can be formed using a formation-mold method. Alternatively, the insulation substrate 1 can be cut into slots. Alternatively, the insulation substrate 1 can be partially laser-melted to form slots. With the laser-melting method, the width of the thin-wall portion 7 can be narrowed to tens of micro-meter by easily adjusting the beam diameter. This method is preferred for large-scale production. From the point of narrowing the width of the thin-wall portion 7, the width of the thin-wall portion 7 can be restrained and the stress sensor can maintain a desired strength.

It is preferable fill the thin-wall portion 7 with a material softer than that of the member with the strain gauges 2 arranged thereon. Because of the thin-wall portion 7, the member with the strain gauges 2 arranged thereon is possible to be plastically deformed due to a stress to the post 6. In this case, since there exists a soft material, the easy-to-deform portion is not extremely damaged and the soft material strengthens the thin-wall portion 7. By adjusting the filling amount, selecting places to be filled and selecting the filler material, the converting ratio of changes of the characteristic of the strain gauge where a stress is applied can be adjusted. By changing the filling status of the thin-wall portion 7, such as by adjusting the overflow amount for overflowing the filler and by adjusting the overflow status of the overflow distance, the converting ratio can be adjusted.

In the case when the member with the strain gauges 2 arranged thereon is made of ceramic, the soft material can be plastic with a strengthened fiber. In the case when the member with the strain gauges 2 arranged thereon is made of plastic with a strengthened fiber such as epoxy mixed with a glass fiber, the soft material can be a material cured from an epoxy resin without a fiber or a material cured from a silicon resin paste or other rubber material.

Moreover, the thin-wall portion 7 as shown in FIG. 1(a) is not visible in FIG. 1(b) due to the arrangement of the thin-wall portion 7 originally. For easy understanding, the thin-wall portion 7 is especially shown in FIG. 1(b).

According to the structure of the present invention, the strain gauges 2 as shown in FIG. 1(b) are arranged on the insulation substrate 1. It is preferred that the line-shaped easy-to-deform portions (i.e. the thin-wall portion) are perpendicular to the straight lines connecting the post 6 and the edges of the insulation substrate 1. With this structure (i.e. representing the line-shaped structure, hereinafter), the loss of a stress to the post 6 can be extremely decreased and the stress can be transferred to the easy-to-deform portion (i.e. the thin-wall portion 7). Thus a stress to the post 6 can be efficiently converted into changes of the characteristic of the strain gauges 2. The reasons for the advantages are as followings.

The minimum region for flexing (i.e. deforming) the insulation substrate 1 to function the stress sensor is the existing region of the strain gauge 2 (resistance element 8). If there is no easy-to-deform portion (i.e. the thin-wall portion 7), a stress to the post 6 effects the whole insulation substrate 1. That is to say some region that is unnecessary to be flexed is still flexed. The region that is unnecessary to be flexed includes the outer region of the insulation substrate 1 beyond the strain gauges 2 (i.e. the edges of the insulation substrate 1) and the region within adjacent strain gauges 2 in the insulation substrate 1. The stress for flexing the unnecessary region cannot be detected from the strain gauge 2 and will become a stress loss.

In the case when easy-to-deform portion (i.e. the thin-wall portion 7) is dot-shaped rather than line-shaped, the stress for flexing the insulation substrate 1 where no dots exist and no strain gauges 2 exist will become a stress loss. However, if the interval from dot to dot is small, it is substantially a line-shaped and almost with no stress-loss. In this condition, the dot-shaped easy-to-deform portion has the same structure and effects as the line-shaped one and can be regarded as a line-shaped one.

Because of the line-shaped structure, a stress loss is decreased and a stress can be efficiently concentrated at the easy-to-deform portion (i.e. thin-wall portion). The forming of the line-shaped structure on the side surface of the post 6 is achieved by forming continuous or intermittent slots around the post 6.

Figure 2:
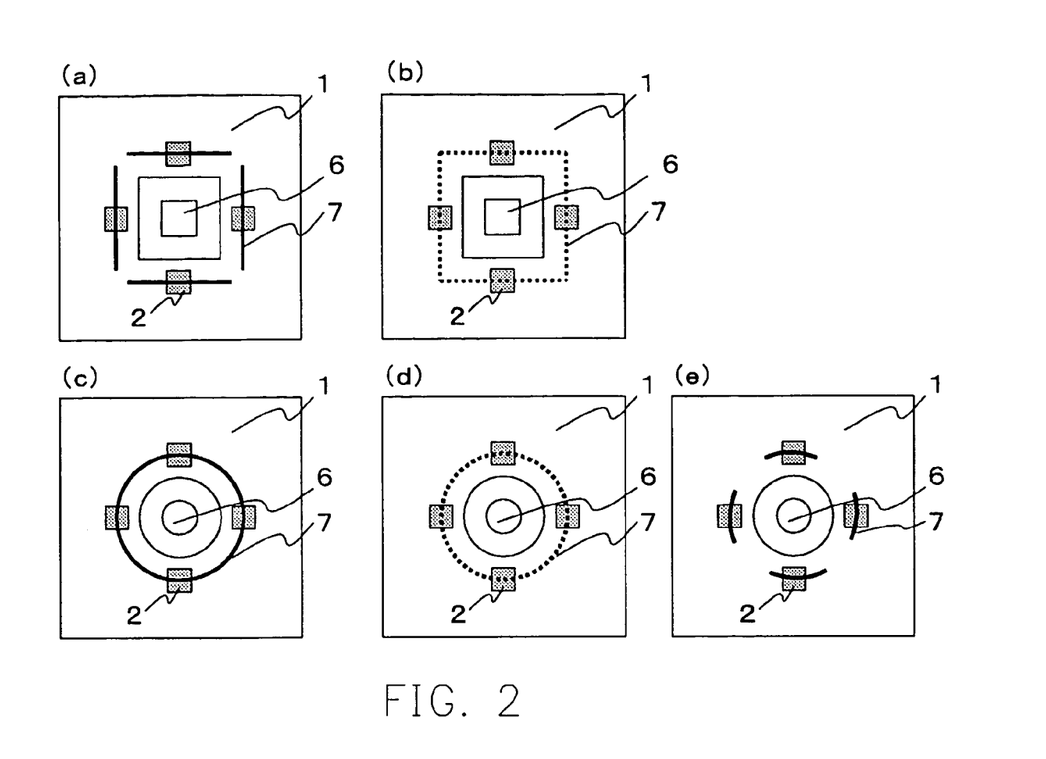
FIG. 2 shows top views of strain sensor of the present invention.

A modified example for the line-shaped structure is a top view of FIG. 2. The strain gauges 2 are arranged at the backside of the insulation substrate 1 as shown in FIG. 2. As shown in FIG. 2(a), the bottom of the post 6 is square-shaped and each of the strain gauges 2 are arranged at the backside of the insulation substrate 1 corresponding to each of the edges of the square, i.e. each of the thin-wall portions 7 individually corresponds to each of the strain gauges 2 without connecting to each other. FIG. 2(b) is the structure of FIG. 1(b), wherein the thin-wall portion 7 is dot-shaped and the dots close to each other to substantially form a line-shaped structure. As shown in FIG. 2(c), the bottom of the post 6 is circular-shaped and the thin-wall portion 7 is ring-shaped. Even with this structure, the thin-wall portion 7 is substantially perpendicular to the straight lines connecting the post 6 and edges of the insulation substrate 1. FIG. 2(d) turns the thin-wall portion 7 of FIG. 2(c) into dot-shaped and the interval from dot to dot is small such that it can be regarded as a line-shaped structure. FIG. 2(e) turns the thin-wall portion 7 of FIG. 2(c) into individual without connecting to each other.

In the case, when each of the thin-wall portions 7 individually corresponds to each of the strain gauges 2 without connecting to each other, and in the case when the thin-wall portion 7 is dot-shaped with a close dot-to-dot interval that is substantially regarded as a line-shaped structure, both of the case have a stress-loss. However, in some cases, the member with the strain gauges arranged thereon with a lower strength is better. This is because the condition for maintaining the member such as the insulation substrate 1 with the strain gauges 2 arranged thereon in a desired strength and the condition for decreasing a stress loss or keeping a high output of a stress sensor are hardly to be all satisfied at the same time. The two conditions are almost contrary to each other. Thus, the stress sensor of the present invention should be designed according the two conditions.

Moreover, in the case when the stress loss can be ignored or is no concern, such as, it is expected that the stress exceeding the require magnitude for stimulating the strain gauges 2, the thin-wall portion 7 is preferred to be individually corresponding to each of the strain gauges 2 without connecting to each other, and the thin-wall portion 7 is also preferred to be dot-shaped with a close dot-to-dot interval such that the dot-shaped thin-wall portion 7 is regarded as a line-shaped structure.

In the explanation to the line-shaped structure, the easy-to-deform portion of the In the explanation to the line-shaped structure, the easy-to-deform portion of the present invention is represented by a thin-wall portion 7. However, the line-shaped easy-to-deform portion is not limited to the thin-wall portion. For example, the material of the easy-to-deform portion can be different from that of the insulation substrate 1.

1 . . . insulation substrate
2 . . . strain gauge
3 . . . resistance element
5 . . . conductor
6 . . . post
7 . . . thin-wall portion
8 . . . resistance element
10 . . . terminal
12 . . . support cavity
14 . . . trimmable chip resistor
16 . . . substrate cavity
18 . . . terminal collection portion
19 . . . depression
20 . . . substrate
22 . . . resistance element
23 . . . post operation portion
24 . . . conductor
30 . . . post
30b . . . bottom profile of the post
31 . . . circuit plate
32 . . . solder

DESCRIPTION OF THE PREFERRED EMBODIMENTS

A stress sensor according to one embodiment of the present invention is applied to a pointing device of a personal computer.

Figure 4:
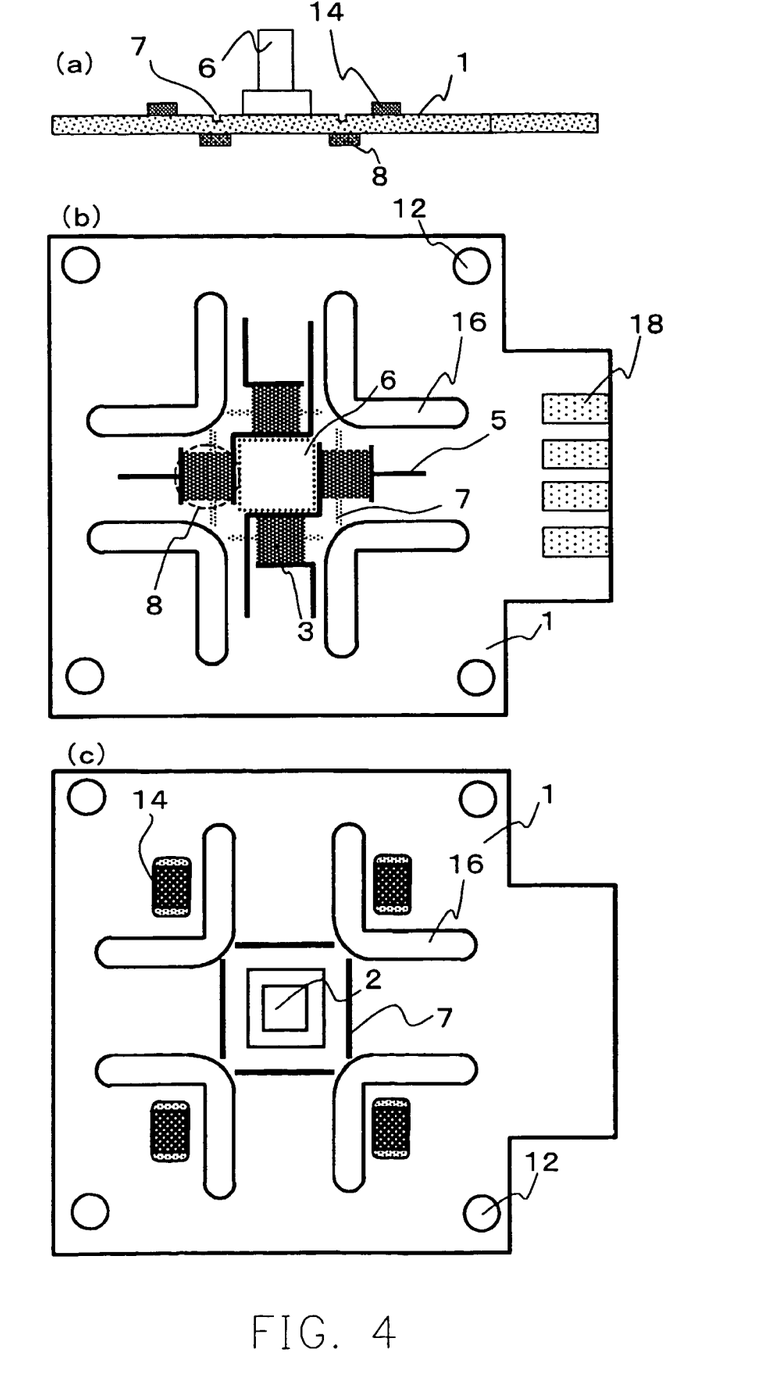
FIGS. 4(a), 4(b) and 4(c) show a side view, a bottom view and a top view of the stress sensor according to one embodiment of the present invention.

FIG. 4 shows a laminated plate (i.e. insulation substrate 1) of 0.8 mm thickness that is mainly made of an epoxy resin mixed with a glass fiber. Thin-wall portions 7 as shown in FIG. 4 are formed by using a press-formation mold. The thin-wall portions 7 with a thickness of 10% of the insulation substrate 1, i.e. about 80 μm are formed.

The thin-wall portions 7 in FIG. 4(a) are not visible in FIG. 4(b) due to the arrangement of the thin-wall portions 7 originally. For easily understanding, the thin-wall portions 7 are especially shown in FIG. 4(b).

Copper foils of thickness of 18 μm serving as conducting layers are attached to two sides of the insulation substrate 1. A circuit pattern (i.e. conductor 5) is formed on the laminated plate with two-side-copper-foil as the insulation substrate 1. Finally the insulation substrate 1 is patterned on the surface and inside of the insulation substrate 1, such that the resistance elements 8, the trimmable chip resistors 14 and the terminals 10 are electrically connected as shown FIG. 3.

Figure 3:
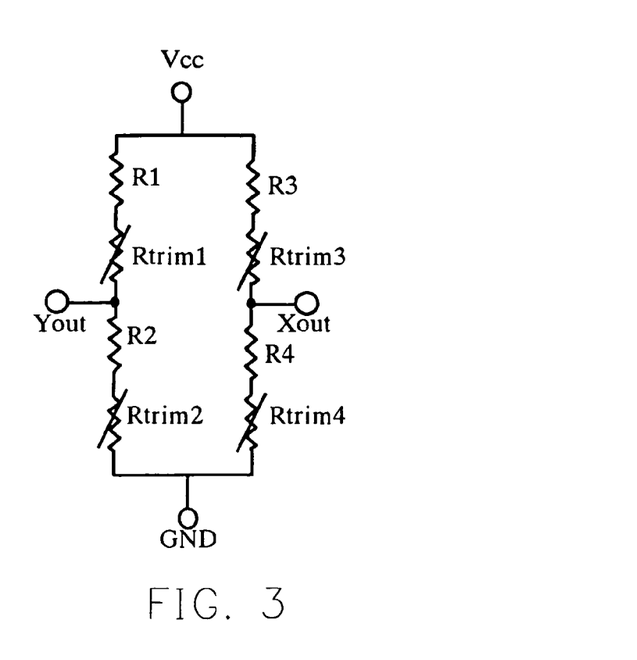
FIG. 3 shows the status of input and out of electrical signals in the strain sensor of the present invention.

In the first step of patterning, some through holes are formed for forming electrical connection path extending from the surface to the inside of the laminated plate with two-side-copper-foil. In the second step of patterning, a conductivity layer is formed at inner-sidewall of the through holes by copper-electroless-plating and copper-electroplating in sequence. In and after the third step of patterning, the conductivity layer on the surface is partially removed by photo-etching of the dry film photoresist to obtain a conductor 5. In FIG. 4, the paths from the end of the conductor 5 to the terminal collection portions 18 are omitted in drawing. By using each of the resistance elements 8 (i.e. R1~R4) and trimmable chip resistors 14 (i.e. Rtrim 1~4), a bridge circuit as shown in FIG. 3 is formed as the path. The terminals (i.e. Vcc, GND, Yout, Xout) in the terminal collection portions 18 are arranged in a predetermined interval.

Figure 6:
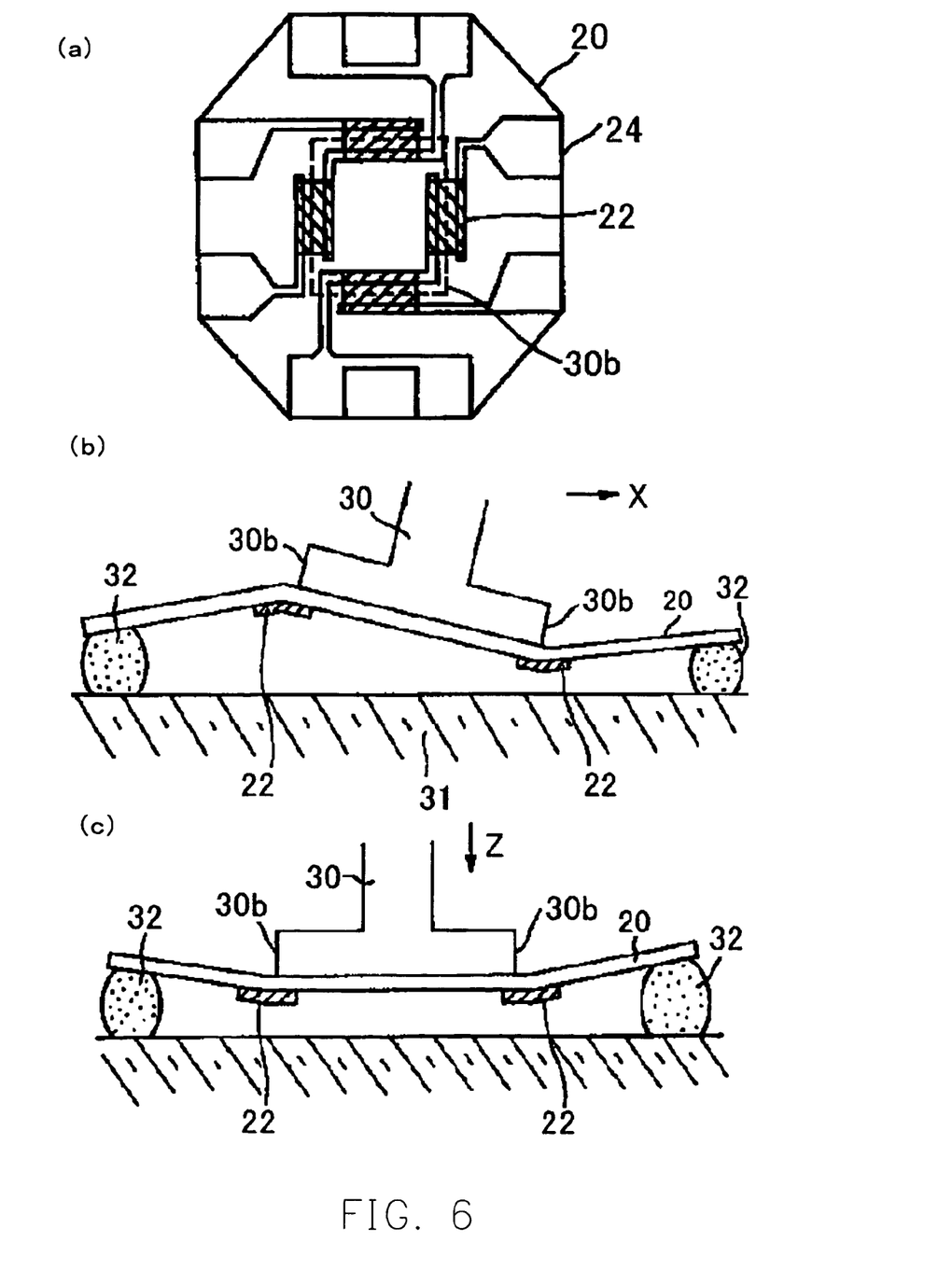
FIG. 6(a) shows the structure of a conventional stress sensor.
FIGS. 6(b) and 6(c) show the operation of the conventional stress sensor.

Each insulation substrate 1 of one unit of the large substrate is punched to form notches for the substrate cavities 16, support cavities 12 and terminal collection portions 18 as shown in FIG. 6. The support cavities 12 formed in the sensor portion of the substrate 1 of one unit are located as 4 apexes of a square. An intersection of the diagonals of the square is substantially equivalent to the center of the bottom profile of the post 6 that is arranged later.

By using screen-printing with a resistance paste made of resin (i.e. carbon-resin), resistors 3 is formed and cured as shown in FIG. 6. Furthermore, in order to protect the resistors 13, a paste made of silicon resin is used for screen-printing. The paste is then cured to form a passivation film. A resistance element 8 is obtained.

The trimmable chip resistors 14 that are electrically connected with each of the resistance elements 8 in series through conductivity 5 by using a reflow method as shown in FIG. 3. The trimmable chip resistors 14 are arranged at one surface opposite to the resistance elements 8 in the sensor portion of the substrate 1.

After that, for adjusting the summation of the resistance of the resistance elements 8 and the trimmable chip resistors 14 that are connected with the resistance elements 8 in series, the trimmable chip resistors 14 are trimmed by a laser. The reason why the resistors 3 constructing the resistance elements 8 are not trimmed is because the resistors 3 have resin portion and the trimmed insulation substrate 1 mainly made of resin will cause resistance unstable. The trimming by laser is conducted at a very high temperature, which is unsuitable to the resin.

The alumina-made post 6 whose bottom profile is square-shaped is fixed at each unit of the insulation substrate 1. The bottom of the post 6 is arranged on the insulation substrate 1 opposite the surface where resistance elements 8 are arranged. The post 6 is fixed at each unit of the insulation substrate 1 in a manner that the center of the bottom is substantially the same as that of the insulation substrate 1. The assembly of the stress sensor is obtained.

The tolerance range of the shift of the post 6 is within the area surrounded by the thin-wall portions 7. FIG. 6 shows the conventional stress sensor whose tolerance range of the shift of the post is very small. This is because the maximum flexing position of the substrate 20 corresponds to the bottom profile of the post 6 and the position is highly related to the performance of the stress sensor. For this point of view, the shift of the post 6 is some how released which is an advantage of the stress sensor of the present invention compared to the conventional one.

The large substrate is cut and separated by disc cutter along cutting lines (i.e. visible lines or invisible lines) on the surface of the large substrate into stress sensors according to the one unit of the insulation substrate 1. In this example, the post 6 is fixed prior to the cutting and the performance of working ability is good. This is because the process of installing the post 6 onto each of the insulation substrates 1 having a stress sensor thereon after cutting is a disadvantage in transferring and handling and is more complex comparing with the process of the large substrate.

The stress sensor comprises strain gauges 2 located on four positions along two perpendicular lines on the surface of the insulation substrate 1, wherein the perpendicular lines intersect at the center of effect region for sensing of the surface of the insulation substrate 1. The strain gauges 2 are arranged equidistant along the intersection of the two perpendicular lines. The center of the surface of the insulation substrate 1 is substantially equivalent to the center of the effect region for sensing and the center of the bottom of the post 6. With this structure, the stress sensor which has the post 6 fixed to or integrated with the insulation substrate 1 is provided.

The stress sensor is fixed onto the frame of an electronics through the support cavities 12. Under a fix condition, the peripheral portion of the substrate 3 beyond the substrate cavities 16 deforms little even when a stress is applied to the post 2 and serving as a non-deforming portion. The portion within the substrate cavities 16 deforms if a stress is applied to the post 5 and serves as a deforming portion that makes the resistance element 8 stretch or contract. The whole region of the deforming portion is the "effect region for sensing" of the substrate 1 for sensor portion. Because the trimmable chip resistors 14 are arranged at the non-deforming portions, the influence due to a stress applied on the post 2 on changes of resistance is little.

In this example, the insulation substrate 1 is made of epoxy resin mixed with a glass fiber. In other words, the insulation substrate 1 is mainly made of resin material. The material of the insulation substrate 1 can be replaced by ceramic such as alumina. However, in the case when a thin-wall portion 7 as the example is formed in a ceramic, the ceramic is easily damaged starting from this portion. Moreover, it is difficult to form a locally-easy-to-deform portion in a ceramic material. Thus, the resin material is preferred to be the main composition of the insulation substrate 1.

FIG. 3 shows input and output statuses of electrical signals of the stress sensor of the present invention. Four sets of resistance elements and trimmable chip resistors construct a bridge circuit. A predetermined voltage is applied between the voltage terminals (Vcc)-(GND) of the bridge circuit. A Y-direction stress sensor is constructed by analyzing the resistance element 8 (R1, 2) at the left side of FIG. 3 and the trimmable chip resistor 14 (Rtrim1, 2) through the Y terminal (Yout). A X-direction stress sensor is constructed by analyzing the resistance element 8 (R3, 4) at the right side of FIG. 3 and the trimmable chip resistor 14 (Rtrim3, 4). Moreover, in the case when the top of the post is pressed downward (Z-direction), the resistance of each of the resistance element increases. This condition is different from the X-direction and Y-direction stress and can be detected.

By adding some functions with respect to the downward stress (Z-direction), the stress sensor can have multi-functions. In this example, the stress sensor of the present invention is used as pointing device of a computer, that is capable to be divided into signals for clicking the mouse. Moreover, in the case of using the stress sensor of the present invention to a multi-function/multi-direction switch of a small portable machine such as a cell phone, the downward stress lasting for a predetermined interval can correspond to an power on/off command of the portable machine.

Whether the trimmable chip resistor 14 is to be used or not depends on the material of construction of the resistance elements and the material of the insulation substrate 1. For example, if the material of the substrate 1 for sensor portion is ceramic, in the case when the material of the resistor 3 is metal glaze, even when the resistor 3 constructing the resistance elements 8 is trimmed by a laser, the instability of the resistance can be negligible. In this case, the stress sensor can be constructed without a trimmable chip resistor 14. If it is necessary to use trimmable chip resistor 14 for any other reason, the trimmable chip resistor 14 of course can be used.

Furthermore, substrate cavities 16 may be set, for example, for making the insulation substrate 1 flex easily and guiding the flexure of the insulation substrate 1 towards the desired direction. With the easy-to-deform portions such as the thin-wall portions 7, it plays both of the above roles as the substrate cavities 16 does. A part of the process for opening the insulation substrate 1 (i.e. opening the substrate cavities 16) can be omitted, which is a merit.

(Another Embodiment)

Figure 5:
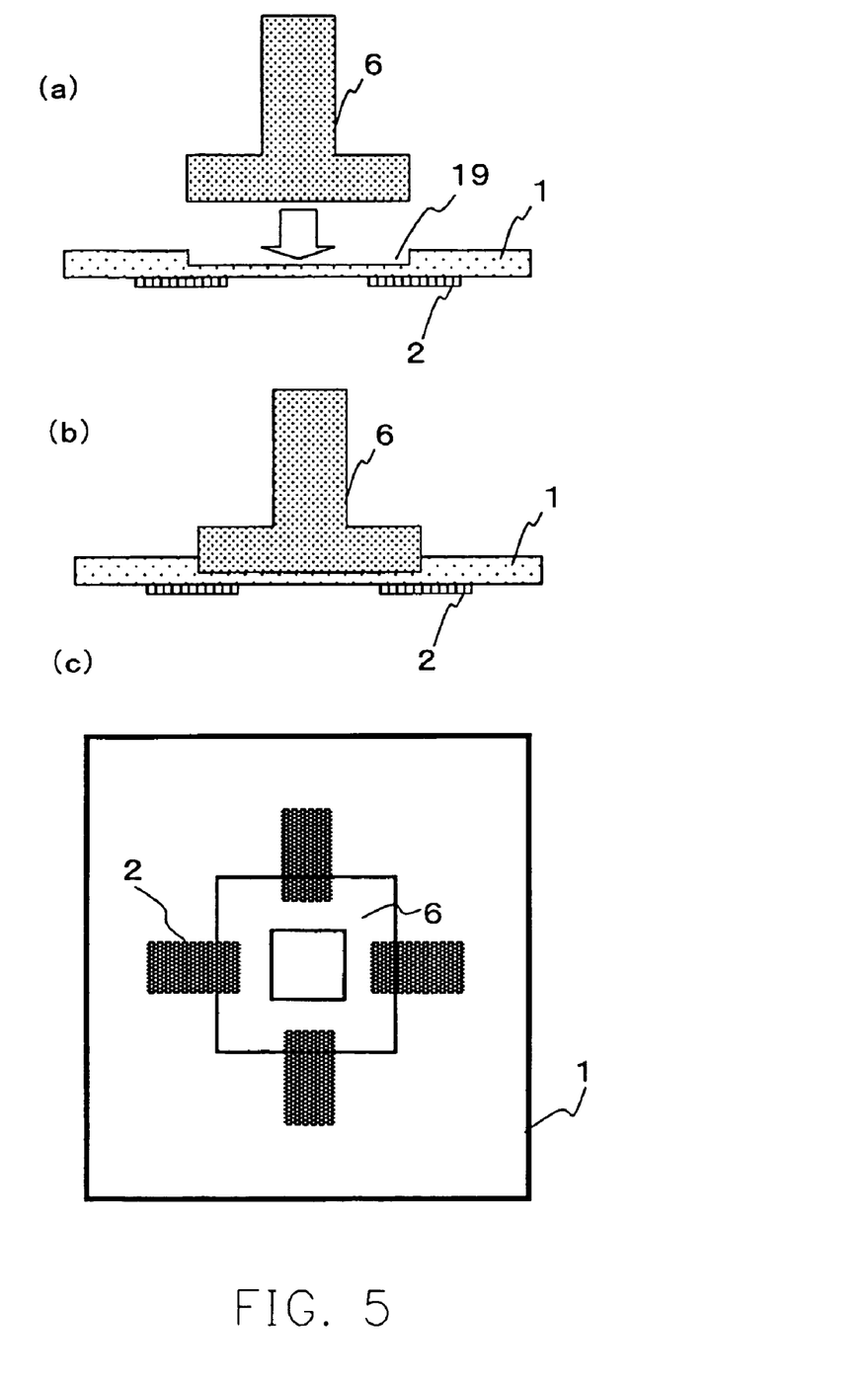
FIGS. 5(a), 5(b) and 5(c) show a side view prior to the embedding of the post, a side view of the embedding of the post and a top view of the stress sensor according to another embodiment of the present invention.

FIG. 5 shows another embodiment of the present invention. As shown in FIG. 5, the stress sensor has a depression 19 in the insulation substrate 1. The depression 19 is embedded within the bottom of the post 6. Strain gauges 2 are arranged at the surface of the insulation substrate 1 at a position corresponding to the profile of the depression 19 with the insulation substrate 1 there-between. The stress sensor can determine the direction and magnitude of a stress applied to the post 6 from changes in the characteristics of a strain gauge 2 made by stimulus to the strain gauge 2 caused by the stress.

FIG. 5(a) shows the status before the bottom of the post 6 is embedded into the depression 19. FIG. 5(b) shows the status after the embedding. In this condition, the bottom profile of the post 6 is substantially equivalent to the profile of the depression 19. In the embedding status, it is preferred that no gap exists between the bottom of the post 6 and the depression 19. If a gap exists between the bottom of the post 6 and the depression 19, the bottom of the post 6 stimulating the bottom of the depression 19 will be regarded equivalent to the thin-wall portions 7 of the insulation substrate 1 such that the bottom of the depression 19 is plastically deformed. The stress sensor is also considered to maintain a desired strength. In the case when an over stress is applied on the post of the stress sensor shown in FIG. 5, the stress is shared by the inner-sidewall of the depression 19. The over stress can be restrained from being applied on the bottom of the depression 19. Moreover, because the bottom of the post 6 is fixed in the depression 19 under a condition that the bottom of the post 6 has been embedded into the depression 19, the effects of stress-sharing can be increased.

It is known from prior art (FIG. 6) that the stress applied to the post 6 is concentrated in the insulation substrate 1 at a location of the bottom profile of the post. In the stress sensor of FIG. 5, the stress is also concentrated at the profile of the depression 19 where the bottom profile of the post 6 is located. Therefore, by arranging the strain gauge 2 at the profile of the depression 19, a stress to the post 6 can be converted efficiently into changes in the characteristics of the strain gauge 2. Because of the above reasons, the stress sensor as shown in FIG. 5 can maintain a desired strength and can efficiently convert a stress to the post 6 into changes in the characteristics of the strain gauge 2. Thus, the insulation substrate 1 of the present invention is unnecessary to be flexed towards one side as the conventional one does. The distance from the bottom profile of the post 6 to the ends of the insulation substrate 1 need not necessarily be as large as the conventional one. The stress sensor can be smaller than the conventional one (FIG. 6). These merits also exist in the stress sensor as shown in FIGS. 1, 2 and 4.

It is preferred that the material of the post 6 has a rigidity higher than or equivalent to that of the material of the insulation substrate 1. Thus, the insulation substrate 1 can be flexed easily and a stress to the post 6 can be transferred to the strain gauge 2 with a high efficiency. In the case when the insulation substrate 1 is made of an epoxy resin mixed with glass fiber, the material of the post 6 is preferably a ceramic such as alumina.

The material for fixing the post 6 and the insulation substrate 1 is preferably an adhesive such as epoxy. The embedding process is preferably implemented during the assembling process from the efficiency point of view. In the case when loading the post 6 on the insulation substrate 1 of a conventional stress sensor, the shift of the post 6 causes the shift of the characteristics of the stress sensor. However, with the stress sensor as shown in FIG. 5, one need not worry about the shift of the characteristic of the stress sensor due to the shift of the post 6. Because the arranging position of the post 6 can be determined in advance.

INDUSTRIAL APPLICATION

According to an embodiment of the present invention, a stress sensor is provided to efficiently convert a stress to the post into changes in characteristics of the strain gauge. In this condition, the stress sensor can be maintained in a desired strength.

What is claimed is:

1. A stress sensor for electronic devices, having a post fixed to or integrated with a surface of an insulation substrate capable of determining a direction and a magnitude of a stress applied to The post from changes in characteristics of a strain gauge made by a stimulus to the strain gauge caused by the stress, wherein the insulation substrate includes a depression formed in one surface of the insulation substrate as a thin-wall portion, and the strain gauge is arranged at a surface of the insulation substrate opposite to the depression, and the strain gauge is arranged crossing the depression, and the depression is filled with a material softer than that of the insulation substrate.

2. The stress sensor as claim 1, comprising strain gauges located on four positions along two perpendicular lines on the surface of the insulation substrate, wherein the perpendicular lines intersect at a center of a effect region for sensing of the surface of the insulation substrate, wherein the strain gauges are arranged equidistant along the intersection of the two perpendicular lines, and the center of the surface of the insulation substrate is substantially equivalent to the center of the effect region for sensing and the center of a bottom of the post, and the post is fixed to or integrated with the insulation substrate.

3. The stress sensor as claim 1, wherein the strain gauge is arranged at a smooth surface of the insulation substrate.

4. The stress sensor as claim 1, wherein the strain gauge is a resistance element produced by a screen-printing process and has a characteristic corresponding to a resistance thereof.

5. The stress sensor as claim 1, wherein the insulation substrate is mainly made of a resin material, and the post has a higher rigidity than that of the resin material.

6. The stress sensor as claim 1, wherein the depression is a locally thin-wall portion of the insulation substrate.

7. The stress sensor as claim 1, wherein the depression is a line-shaped.

8. The stress sensor as claim 7, wherein the line-shaped depression is substantially perpendicular to straight lines extending from the post to edges of the insulation substrate.

* * * * *